United States Patent
Prucka et al.

(10) Patent No.: US 8,447,449 B2
(45) Date of Patent: May 21, 2013

(54) BELT SLIP DETECTION DIAGNOSTIC

(75) Inventors: Michael Prucka, Ann Arbor, MI (US);
Stanley D. Sullivan, Novi, MI (US);
Andrew M. Zettel, Ann Arbor, MI (US);
John G. Noetzel, Brighton, MI (US);
Michael William Roblin, Howell, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 351 days.

(21) Appl. No.: 12/974,030

(22) Filed: Dec. 21, 2010

(65) Prior Publication Data
US 2012/0158226 A1  Jun. 21, 2012

(51) Int. Cl.
*B60L 9/00* (2006.01)
*B60L 11/00* (2006.01)

(52) U.S. Cl.
USPC ............... 701/22; 477/14; 180/178; 318/66; 318/432

(58) Field of Classification Search
USPC ....... 701/22; 477/44; 123/406.54; 180/65.28, 180/178; 318/432, 434, 66, 68, 80; 361/1
See application file for complete search history.

(56) References Cited

U.S. PATENT DOCUMENTS

| | | | | |
|---|---|---|---|---|
| 4,949,828 A * | 8/1990 | Olsen | ...................... | 192/84.961 |
| 4,987,967 A * | 1/1991 | Kouno | ...................... | 180/233 |
| 5,152,191 A * | 10/1992 | Sato et al. | ...................... | 477/36 |
| 5,497,870 A * | 3/1996 | Takashi | ...................... | 192/84.96 |
| 6,107,761 A * | 8/2000 | Seto et al. | ...................... | 318/139 |
| 7,243,010 B2 * | 7/2007 | Tabata et al. | ...................... | 701/22 |
| 7,699,039 B2 * | 4/2010 | Carlsson et al. | ...................... | 123/406.53 |
| 8,207,840 B2 * | 6/2012 | Zhang et al. | ...................... | 340/455 |
| 2010/0197455 A1 * | 8/2010 | Iwatsuki et al. | ...................... | 477/44 |
| 2011/0000421 A1 * | 1/2011 | Zhang et al. | ...................... | 116/28 R |
| 2012/0158226 A1 * | 6/2012 | Prucka et al. | ...................... | 701/22 |

FOREIGN PATENT DOCUMENTS

| | | | |
|---|---|---|---|
| DE | 102010025798 A1 * | 2/2011 | |
| EP | 1111394 A1 * | 6/2001 | |
| EP | 1403565 A2 * | 3/2004 | |

(Continued)

OTHER PUBLICATIONS

Implementation of a slip controlled CVT in a production vehicle; Bonsen, B.et al; Control Applications, 2005. CCA 2005. Proceedings of 2005 IEEE Conf. on; Topic(s): Components, Circuits, Devices & Systems ; Robotics & Control Systems Digital Object Id: 10.1109/CCA.2005.1507296; Pub. Year: 2005 , pp. 1212-1217.*

(Continued)

*Primary Examiner* — Cuong H Nguyen
(74) *Attorney, Agent, or Firm* — Quinn Law Group, PLLC

(57) ABSTRACT

A vehicle includes an engine, a motor, a belt, and a controller. The engine is configured to output torque via a crankshaft. The motor is configured to apply torque to and/or receive torque from the engine via an output shaft. The belt is operably disposed on the crankshaft of the engine and the output shaft of the motor. Rotation of the output shaft is transferred to the crankshaft via the belt. The controller is configured to identify a slip event by comparing a speed of the motor to a speed of the engine. The controller is further configured to count the number of slip events and diagnose a belt failure if the number of slip events exceeds a predetermined number of slip events over a predetermined number of drive cycles.

20 Claims, 1 Drawing Sheet

FOREIGN PATENT DOCUMENTS

| GB | 2435522 A | * | 8/2007 |
| JP | 8-012222 | * | 1/1996 |
| JP | 2009058458 | * | 11/2009 |
| WO | WO 2010125666 A1 | * | 11/2010 |

OTHER PUBLICATIONS

The CVT test design on a tester; Sun Longlin; Electric Information and Control Engineering (ICEICE), 2011 International Conference on; Digital Object Identifier: 10.1109/ICEICE.2011.5777075; Publication Year: 2011, pp. 4580-4582.*

Dynamic behavior of belt element and band of metal V-belt CVT based on Adams; Yali Yang et al.; Computer Engineering and Technology (ICCET), 2010 2nd Inter. Conf. on; vol. 5; Digital Object Identifier: 10.1109/ICCET.2010.5486057 Publication Year: 2010, pp. V5-345-V5-348.*

A practical approach for belt slip detection in automotive electric power generation and storage system; Yilu Zhang et al.; Aerospace Conf., 2010 IEEE; Digital Object Id: 10.1109/AER0.2010.5446832; Pub. Year: 2010, pp. 1-7.*

* cited by examiner

BELT SLIP DETECTION DIAGNOSTIC

TECHNICAL FIELD

The invention relates to a belt slip detection diagnostic.

BACKGROUND

Passenger and commercial vehicles may use various belts in the powertrain system. For example, in a hybrid vehicle, a belt may be used to transfer torque between an engine and a motor. Belts are used in other applications besides vehicles, such as product transportation systems.

SUMMARY

A vehicle includes an engine, a motor, a belt, and a controller. The engine has a crankshaft and the engine is configured to output torque via the crankshaft. The motor has an output shaft and is configured to apply torque to the engine, receive torque from the engine, or both. The belt is operably disposed on the crankshaft of the engine and the output shaft of the motor. Rotation of the output shaft is transferred to the crankshaft via the belt. The controller is configured to identify a slip event of the belt by comparing a speed of the motor to a speed of the engine. The controller is configured to count the number of slip events and diagnose a belt failure if the number of slip events exceeds a predetermined number of slip events over a predetermined number of drive cycles.

A method of detecting a belt failure includes identifying a slip event of the belt, counting a number of slip events, determining whether the number of slip events exceeds a predetermined number of slip events, and determining whether the number of slip events occurred over a predetermined number of operating cycles. The method further includes diagnosing the belt failure if the number of slip events is equal to or greater than the predetermined number of slip events and if the slip events occurred over the predetermined number of operating cycles.

Another vehicle includes an engine having a crankshaft and configured to output torque via the crankshaft, a motor having an output shaft and configured to apply torque to the engine, receive torque from the engine, or both, and a belt operably disposed on the crankshaft of the engine and the output shaft of the motor. Rotation of the output shaft is transferred to the crankshaft via the belt. A controller is configured to identify a slip event of the belt by comparing an actual speed of the motor to an effective speed of the engine, count the number of slip events, and diagnose a belt failure if the number of slip events exceeds a predetermined number of slip events over a predetermined number of drive cycles. Additionally, the controller is configured to identify the slip event if the actual speed of the motor is substantially different than the effective speed of the engine and reduce the actual speed of the motor during the slip event until the actual speed of the motor and the effective speed of the engine are substantially the same. The controller is configured to determine the effective speed of the engine by multiplying an actual speed of the engine by a pulley ratio. The controller is also configured to count the number of drive cycles by detecting a key-on event and by determining whether a predetermined amount of time has elapsed between the key-on event and a previous key-off event. Moreover, the controller is configured to count a number of attempts to diagnose the belt failure, compare the number of attempts to diagnose the belt failure to the number of drive cycles, and determine an execution rate based on a ratio of the number of attempts to diagnose the belt failure to the number of drive cycles.

With the implementations described herein, a diagnostic system may distinguish between worn, wet, and broken belts.

The above features and advantages and other features and advantages of the present invention are readily apparent from the following detailed description of the best modes for carrying out the invention when taken in connection with the accompanying drawings.

DETAILED DESCRIPTION

A vehicle is provided with a diagnostic system that is able to distinguish between worn, wet, and broken belts, which reduces warranty costs associated with falsely diagnosing wet belts as worn or broken. The diagnostic system disclosed herein may be further used in other applications, such as a belt-driven conveyor system. Using the diagnostic system described herein may result in fewer conveyor line shutdowns, and accordingly, reduced losses in revenue due to the shutdown.

Figure 1:
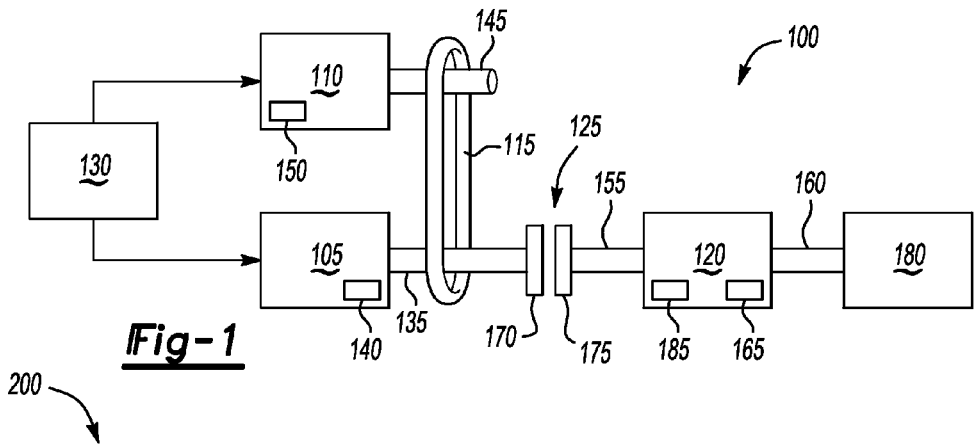
FIG. 1 is a schematic diagram of an example vehicle configured to diagnose worn, wet, and broken belts.

FIG. 1 illustrates a diagnostic system implemented in a vehicle 100. The vehicle 100 may take many different forms and include multiple and/or alternate components and facilities. While an example vehicle is shown in the Figures, the components illustrated in the Figures are not intended to be limiting. Indeed, additional or alternative components and/or implementations may be used.

The vehicle 100 includes an engine 105, a motor 110, a belt 115, a transmission 120, a clutch assembly 125, and a controller 130. The vehicle 100 may be any passenger or commercial automobile. Further, the diagnostic system may be implemented in a hybrid electric vehicle including a plug-in hybrid electric vehicle (PHEV) or an extended range electric vehicle (EREV), a gas-powered vehicle, a battery electric vehicle (BEV), or the like.

The engine 105 may include any device configured to generate a torque by converting energy from a fuel. For example, the engine 105 may be an internal combustion engine configured to generate torque by burning a fuel and air mixture. Other types of engines 105 may include an external combustion engine (e.g., a Stirling engine), a hydrogen-powered engine, a hydraulic engine, a steam engine, etc. The engine 105 may be configured to provide torque via a crankshaft 135. The operation of the engine 105 may be controlled by an engine control unit 140.

The motor 110 may include any device configured to generate a torque from electrical energy. For instance, the motor 110 may receive electrical energy from a power source (not shown), such as a battery, fuel cell, or the like. The motor 110 may provide torque via an output shaft 145. In one example approach, the motor 110 may further act as a generator. For instance, the motor 110 may be configured to charge the power source when a torque is provided to the output shaft 145 of the motor 110. Further, the motor 110 may be configured to provide a tractive torque to a drive train (not shown) of the vehicle 100. The operation of the motor 110 may be controlled by a motor control unit 150.

The belt 115 may include any device configured to transfer torque between the motor 110 and the engine 105. Although not shown, a belt tensioner may be used to tension the belt 115 during operation, such as while receiving torque from the engine 105 and/or providing torque to the engine 105. In one possible implementation, the belt 115 may be operatively disposed on the crankshaft 135 of the engine 105 and the output shaft 145 of the motor 110. With the belt 115, the rotation of the crankshaft 135 may cause the output shaft 145 of the motor 110 to rotate, and vice versa. Therefore, the engine 105 may be used to rotate the motor 110 to, for example, cause the motor 110 to generate electrical energy that may be stored by the power source. In addition, the belt 115 may allow the motor 110 to provide torque to the engine 105 to, for example, crank the engine 105. The belt 115 may have various features, such as a high coefficient of friction, that may cause the belt 115 to rotate with the crankshaft 135 and the output shaft 145. When operating properly (e.g., the belt 115 is not worn, wet, or broken), the belt 115 may cause the crankshaft 135 and the output shaft 145 of the motor 110 to rotate at proportional speeds. That is, there may be a pulley ratio that defines a proportional relationship between the speeds of the engine 105 and the motor 110. In one possible approach, the speed of the engine 105 or crankshaft 135 may be multiplied by the pulley ratio. As used herein, the actual speed of the engine 105 or crankshaft 135 multiplied by the pulley ratio may be referred to as the "effective speed" of the engine 105 or crankshaft 135. The effective speed of the engine 105 and/or crankshaft 135 may be substantially the same as the actual speed of the motor 110 and/or output shaft 145 in a no-slip condition. If worn or wet, the belt 115 may slip, which may allow the crankshaft 135 and the output shaft 145 of the motor 110 to rotate at different speeds (e.g., after the speed of the crankshaft 135 is multiplied by the pulley ratio) since not all of the torque is transferred between the engine 105 and the motor 110 via the belt 115. If broken, the belt 115 may be unable to transfer any torque between the engine 105 and the motor 110.

The transmission 120 may include any device configured to transfer torque to the wheels 180 of the vehicle 100. For instance, the transmission 120 may include an input shaft 155, an output shaft 160, and a gearbox 165. The input shaft 155 may include any device configured to receive the torque generated by the crankshaft 135 of the engine 105. The output shaft 145 may include any device configured to output torque from the transmission 120 to the wheels 180 of the vehicle 100. The gearbox 165 may include any device configured to convert the torque provided from the input shaft 155 to the torque provided to the output shaft 145. For instance, the gearbox 165 may include a plurality of gears with various gear ratios that are configured to cause the input shaft 155 and output shaft 145 to rotate at different speeds. Accordingly, the gearbox 165 may convert the speed of the engine 105 and/or motor 110 into the rotational speed provided to the wheels 180 of the vehicle 100. In one possible approach, a driver of the vehicle 100 may select among the various gears using a gear shifter (not shown) in a passenger compartment of the vehicle 100. Additional operation of the transmission 120 may be controlled by a transmission control unit 185.

The clutch assembly 125 may include any hydraulically or electrically actuated device configured to transfer torque from the engine 105 to the transmission 120. For instance, the clutch assembly 125 may be operably disposed on the crankshaft 135 and the input shaft 155. In one possible implementation, the clutch assembly 125 may include a driving mechanism 170 and a driven mechanism 175. The driving mechanism 170 may be operably disposed on the crankshaft 135. The driven mechanism 175 may be operably disposed on the input shaft 155 of the transmission 120. When the driving mechanism 170 and the driven mechanism 175 are engaged, the crankshaft 135 and the input shaft 155 may rotate at substantially the same speed. When disengaged, the crankshaft 135 and the input shaft 155 are free to rotate at different speeds. The driving mechanism 170 and the driven mechanism 175 may be configured to engage via friction.

Alternatively, the vehicle 100 may include a torque converter (not shown) instead of the clutch assembly 125. The torque converter may include an impeller, a turbine, and a stator. The impeller may be operably connected to the crankshaft 135 and may be configured to direct fluid to the turbine. The turbine may be operably disposed on the input shaft 155. The turbine may be configured to rotate upon receipt of the fluid from the impeller. The stator may be used to direct fluid from the turbine back to the impeller.

The controller 130 may include any device configured to identify a slip between the motor 110 and the engine 105. For instance, a slip may be caused by the belt 115 becoming worn, wet, or broken. That is, when worn or wet, the belt 115 may not be able to transfer as much torque between the engine 105 and the motor 110. When broken, the belt 115 may not be able to transfer any torque between the engine 105 and the motor 110. As such, in one possible implementation, the controller 130 may be configured to compare the speeds of the engine 105 and motor 110 to one another, and identify a slip event if the speeds of the engine 105 and the motor 110 are substantially different. In response to detecting a slip event, the controller 130 may be configured to reduce the speed of the motor 110 by, for example, reducing the torque of the motor 110 until the effective speed of the engine 105 (e.g., the actual engine speed adjusted by the pulley ratio) and the actual speed of the motor 110 are substantially the same.

The controller 130 may be further configured to execute a diagnostic procedure to diagnose a belt failure. The controller 130 may count the number of slip events and diagnose the belt failure if the number of slip events exceeds a predetermined number of slip events over a predetermined number of drive cycles. The controller 130 may be configured to identify a drive cycle based, at least in part, on a key-on event (e.g., the driver turning the key to an "on" position). Moreover, the controller 130 may require that a predetermined amount of time elapse between drive cycles. For instance, the controller 130 may be configured to detect a key-on event, determine whether the key-on event occurred at least the predetermined amount of time after a previous key-off event (e.g., the driver turning the key to an "off" position). In one possible approach, the controller 130 may be configured to determine whether the belt 115 was exposed to moisture (e.g., rain, puddles, high humidity, etc.). Further, the predetermined amount of time may be based, at least in part, on the amount of time for the belt 115 to dry following exposure to moisture.

In operation, the controller 130 may be configured to detect multiple (e.g., more than one) drive cycles, including a first drive cycle and a second drive cycle. The controller 130 may be further configured to count the number of slip events that occur during the first drive cycle and compare that number to a first predetermined number of slip events. If the number of slip events during the first drive cycle exceeds the first predetermined number of slip events, the controller 130 may be configured to indicate a soft fail condition. During the soft fail condition, the driver may not experience any difference in the driving condition. Subsequently, if the number of slip events during the second drive cycle, which may be the next drive cycle following the first drive cycle, exceeds the second predetermined number of slip events, the controller 130 may be configured to diagnose the belt failure. Upon diagnosing the belt failure, the controller 130 may cause an indicator light, such as a belt state of health indicator, on the vehicle dashboard (not shown) to illuminate and warn the driver that the vehicle 100 requires immediate service. The controller 130 may take other remedial measures as well.

The controller 130 may be further configured to determine an execution rate of the diagnostic procedure described above. For instance, the controller 130 may be configured to count a number of attempts to diagnose the belt failure and compare the number of attempts to the number of drive cycles. The controller 130 may be configured to identify the ratio of the number of attempts to the number of drive cycles as the execution rate.

The controller 130 may be embodied in one or more electronic devices. Further, the engine control unit 140, the motor control unit 150, the transmission control unit 185, or a combination of the three may perform various functions of the controller 130. Alternatively, the controller 130 may replace one or more of the engine control unit 140, the motor control unit 150, and the transmission control unit 185.

In general, computing systems and/or devices, such as the controller 130, the engine control unit 140, the motor control unit 150, the transmission control unit 185, etc., may employ any of a number of computer operating systems and generally include computer-executable instructions, where the instructions may be executable by one or more computing devices such as those listed above. Computer-executable instructions may be compiled or interpreted from computer programs created using a variety of well known programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Figures 2, 3, 4, 5:
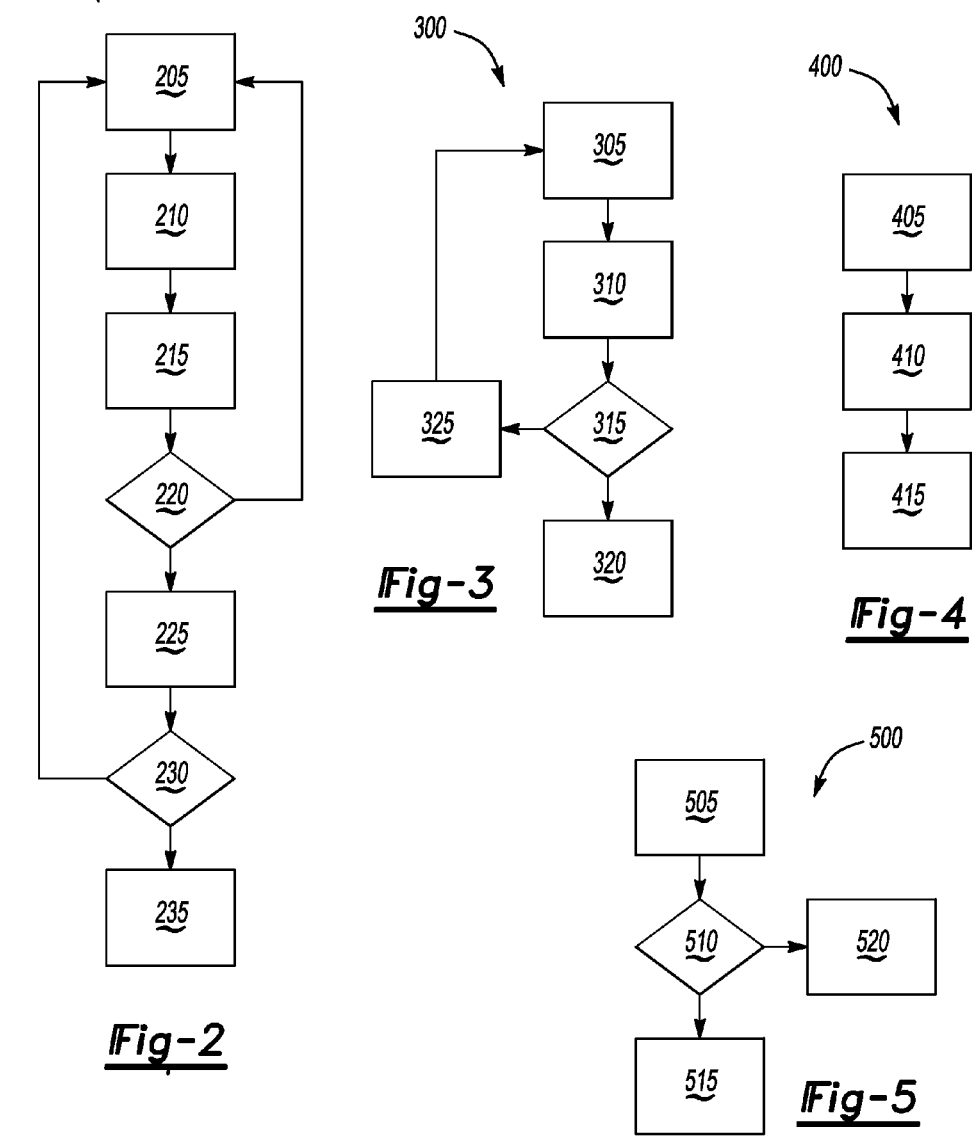
FIG. 2 illustrates an example flowchart of a diagnostic process that may be implemented by the vehicle of FIG. 1.
FIG. 3 illustrates an example flowchart of a diagnostic process that may be implemented by the vehicle of FIG. 1 to identify a slip event.
FIG. 4 illustrates an example flowchart of a process that may be implemented by the vehicle of FIG. 1 to determine an execution rate of the diagnostic process of FIG. 2.
FIG. 5 illustrates an example flowchart of a process that may be used by the vehicle of FIG. 1 to count a number of drive cycles.

FIG. 2 illustrates an example process 200 that may be implemented by the vehicle 100 of FIG. 1. For instance, the controller 130 may use the process 200 to detect a belt failure in the vehicle 100. This process 200 is merely an example of the process 200 that may be used by the controller 130.

At block 205, the controller 130 may identify the slip event. For example, the controller 130 may compare the actual speed of the motor 110 to the effective speed of the engine 105 (e.g., the actual speed of the engine 105 multiplied by the pulley ratio) and identify the slip event if the effective speed of the engine 105 and the actual speed of the motor 110 are substantially different. One possible process 300 of identifying the slip event is described in greater detail below with reference to FIG. 3.

At block 210, the controller 130 may command, via the motor control unit 150, that the torque of the motor 110 be reduced until the motor speed is substantially the same as the effective speed of the engine 110 (e.g., the slip between the motor 110 and the engine 105 is substantially zero).

At block 215, the controller 130 may count the number of slip events. For instance, the controller 130 may count each instance of the controller 130 commanding the reduced motor torque, as indicated at block 210, as a slip event.

At decision block 220, the controller 130 may determine whether the number of slip events exceeds the predetermined number of slip events. In one possible implementation, the controller 130 may compare the number of slip events counted at block 215 to the predetermined number of slip events. If the number of slip events meets or exceeds the number of predetermined slip events, the process 200 may continue at block 225. If not, the process 200 may return to block 205.

At block 225, the controller 130 may count the number of operating cycles. For instance, the controller 130 may determine that each key-on event counts as an operating cycle. Alternatively, the controller 130 may be configured to require a predetermined amount of time that has elapsed between drive cycles. For instance, the controller 130 may only count a key-on event as a new drive cycle if a predetermined amount of time has elapsed between the key-on event and the previous key-off event. One example process 500 of counting the number of drive cycles is illustrated below in FIG. 5. When used to detect slip in a conveyor belt, the controller 130 may count the number of start events, which may include any instance where the conveyor belt is started.

At decision block 230, the controller 130 may determine whether the number of operating cycles counted at block 225 exceeds the predetermined number of operating cycles. For instance, the controller 130 may require that slip be identified over at least two drive cycles before diagnosing the belt failure. This way, the controller 130 may provide adequate time for the belt 115 to dry if, for instance, the belt slip was caused by a wet belt 115 prior to diagnosing the belt failure. If the number of drive cycles meets or exceeds the predetermined number of drive cycles, the process 200 may continue at block 235. If not, the process 200 may continue at block 205.

At block 235, the controller 130 may diagnose the belt failure and take a remedial measure, such as illuminating an indicator light on the vehicle dashboard or a conveyor belt controller to warn the driver or conveyor belt operator that service is needed.

FIG. 3 illustrates an example process 300 that may be used by, for example, the controller 130 to identify the slip event.

At block 305, the controller 130 may receive an engine speed. For instance, the controller 130 may receive the actual engine speed from a speed sensor (not shown) operably disposed on or near the engine 105 or crankshaft 135 or derive the engine speed based on a commanded speed of the engine 105. The controller 130 may multiply the actual engine speed by the pulley ratio to determine the effective engine speed.

At block 310, the controller 130 may receive a motor speed from, for example, a speed sensor (not shown) operably disposed on or near the motor 110. Alternatively, the controller 130 may derive the motor speed from a commanded torque of the motor 110.

At decision block 315, the controller 130 may determine whether the actual speed of the motor 110 is substantially the same as the effective speed of the engine 105. For instance, the controller 130 may compare the effective speed of the engine 105 to the actual speed of the motor 110. If the engine 105 is providing torque to the motor 110, the controller 130 may expect the speed of the motor 110 to be substantially the same as the commanded engine speed multiplied by the pulley ratio. If, however, the motor 110 is providing torque to the engine 105, the controller 130 may expect the effective speed of the engine 105 to be substantially the same as the commanded motor speed. If the effective speed of the engine 105 and the actual speed of the motor 110 are determined to be substantially the same (e.g., indicating little to no slip in the belt 115), the process 300 may continue at block 320. If these speeds of the engine 105 and motor 110 are determined to be substantially different, the process 300 may continue at block 325.

At block 325, the controller 130 may determine that there is no slip and continue the process 300 at block 305. As discussed in greater detail below, the controller 130 may count this portion of the process 300 as an attempt to diagnose the belt failure. Therefore, the controller 130 may further increment the number of attempts to diagnose the belt failure (as illustrated in FIG. 4).

At block 325, the controller 130 may determine that the slip event occurred. Following this determination, the process 300 may continue with block 210 of the process 200 as illustrated above in FIG. 2. Moreover, the controller 130 may count this portion of the process 300 as an attempt to diagnose the belt failure and increment the number of attempts to diagnose the belt failure as indicated in FIG. 4.

FIG. 4 illustrates an example process 400 for determining an execution rate of the diagnostic process of FIG. 1.

At block 405, the controller 130 may count the number of attempts to diagnose the belt failure. For instance, the controller 130 may count each instance of determining whether the speed of the motor 110 is substantially the same as the effective speed of the engine 105 (as in block 315 of FIG. 3) as an attempt to diagnose the belt failure. Alternatively, the controller 130 may increment the number of attempts to diagnose the belt failure based on the outcome of the determination at block 315 (e.g., at blocks 320 or 325).

At block 410, the controller 130 may receive or count the number of drive cycles using the process 500 discussed below with respect to FIG. 5. Of course, the controller 130 may use other processes to count the number of drive cycles than disclosed herein.

At block 415, the controller 130 may compare the number of attempts to diagnose the belt failure to the number of drive cycles. For example, the controller 130 may determine the execution rate to be at least partially based on the ratio of the number of attempts to diagnose the belt failure to the number of drive cycles.

FIG. 5 illustrates an example process 500 of counting the number of drive cycles that may be used by the controller 130.

At block 505, the controller 130 may detect a key-on event. For instance, the key-on event may include any event that indicates the driver's intention to turn the vehicle 100 on. Thus, the key-on event may include the driver turning the key to an "on" position.

At decision block 510, the controller 130 may determine whether a predetermined amount of time has elapsed between the key-on event and a previous key-off event. The key-off event may include any event that indicates the driver's intention to turn the vehicle 100 off (e.g., turning the key to an "off" position). The controller 130 may determine the time of the key-off event and compare the time of the key-off event to the time of the key-on event to determine the amount of time that has elapsed. Alternatively, the controller 130 may use a counter to determine whether the predetermined amount of time has elapsed. In one possible implementation, immediately following the key-off event, the controller 130 may set a flag indicating that the predetermined amount of time has not elapsed. However, after the predetermined amount of time has elapsed, the controller 130 may clear the previous flag or set another flag to indicate that the predetermined amount of time has elapsed, which may allow the controller 130 to stop counting time. If the predetermined amount of time has elapsed between the key-on event and the previous key-off event, the process 500 may continue at block 515, where the controller 130 may increment the number of drive cycles. If not, the process 500 may continue at block 520, where the controller 130 may maintain the previous number of drive cycles since not enough time has elapsed to warrant a new drive cycle.

While the best modes for carrying out the invention have been described in detail, those familiar with the art to which this invention relates will recognize various alternative designs and embodiments for practicing the invention within the scope of the appended claims.

The invention claimed is:

1. A vehicle comprising:
an engine having a crankshaft and configured to output torque via the crankshaft;
a motor having an output shaft and configured to at least one of apply torque to and receive torque from the engine;
a belt operably disposed on the crankshaft of the engine and the output shaft of the motor, wherein rotation of the output shaft is transferred to the crankshaft via the belt; and
a controller configured to identify a slip event of the belt by comparing a speed of the motor to a speed of the engine, and wherein the controller is configured to count the number of slip events and diagnose a belt failure if the number of slip events exceeds a predetermined number of slip events over a predetermined number of drive cycles.

2. A vehicle as set forth in claim 1, wherein the predetermined number of drive cycles is greater than one.

3. A vehicle as set forth in claim 1, wherein the predetermined number of drive cycles is based on a predetermined amount of time.

4. A vehicle as set forth in claim 3, wherein the controller is configured to determine whether the belt was exposed to moisture, and wherein the predetermined amount of time is based on an amount of time for the belt to dry.

5. A vehicle as set forth in claim 1, wherein the controller is configured to reduce the speed of the motor during the slip event.

6. A vehicle as set forth in claim 1, wherein the controller is configured to determine an actual speed of the motor and an effective speed of the engine, and wherein the controller is configured to identify the slip event if the actual speed of the motor is substantially different than the effective speed of the engine.

7. A vehicle as set forth in claim 6, wherein the controller is configured to reduce the torque of the motor until the actual speed of the motor and the effective speed of the engine are substantially the same.

8. A vehicle as set forth in claim 1, wherein the predetermined number of drive cycles includes a first drive cycle and a second drive cycle, and wherein the predetermined number of slip events includes a first predetermined number of slip events during the first drive cycle and a second predetermined number of slip events during the second drive cycle.

9. A vehicle as set forth in claim 8, wherein the controller is configured to indicate a soft fail condition if the number of slip events exceeds the first number of slip events during the first drive cycle.

10. A vehicle as set forth in claim 9, wherein the controller is configured to diagnose the belt failure if the number of slip events exceeds the second number of slip events during the second drive cycle.

11. A vehicle as set forth in claim 1, wherein the controller is configured to count the number of drive cycles by detecting a key-on event and by determining whether a predetermined amount of time has elapsed between the key-on event and a previous key-off event.

12. A vehicle as set forth in claim 1, wherein the controller is configured to count a number of attempts to diagnose the belt failure.

13. A vehicle as set forth in claim 12, wherein the controller is configured to compare the number of attempts to diagnose the belt failure to the number of drive cycles and determine an execution rate based on a ratio of the number of attempts to diagnose the belt failure to the number of drive cycles.

14. A method of detecting a belt failure, the method comprising:
identifying a slip event of the belt;
counting a number of slip events;
determining whether the number of slip events exceeds a predetermined number of slip events;
determining whether the number of slip events occurred over a predetermined number of operating cycles; and
diagnosing the belt failure if the number of slip events is equal to or greater than the predetermined number of slip events and if the slip events occurred over the predetermined number of operating cycles.

15. A method as set forth in claim 14, wherein identifying the slip event includes:
determining an actual speed of a motor;
determining an effective speed of an engine;
comparing the effective speed of the engine to the actual speed of the motor; and
determining that the slip event occurred if the effective speed of the engine is substantially different than the actual speed of the motor.

16. A method as set forth in claim 15, further comprising reducing the actual speed of the motor until the effective speed of the engine and the actual speed of the motor are substantially the same, and wherein counting the number of slip events includes counting the number of times the actual speed of the motor is reduced to be substantially the same as the effective speed of the engine.

17. A method as set forth in claim 14, further comprising:
counting a number of attempts to diagnose the belt failure;
comparing the number of attempts to diagnose the belt failure to the number of operating cycles; and
determining an execution rate based on a ratio of the number of attempts to diagnose the belt failure to the number of operating cycles.

18. A method as set forth in claim 14, further comprising counting a number of operating cycles.

19. A method as set forth in claim 18, wherein counting the number of operating cycles includes:
detecting a key-on event;
determining whether a predetermined amount of time has elapsed between the key-on event and a previous key-off event; and
incrementing the number of operating cycles if the predetermined amount of time has elapsed between the key-on event and the previous key-off event.

20. A vehicle comprising:
an engine having a crankshaft and configured to output torque via the crankshaft;
a motor having an output shaft and configured to at least one of apply torque to and receive torque from the engine;
a belt operably disposed on the crankshaft of the engine and the output shaft of the motor, wherein rotation of the output shaft is transferred to the crankshaft via the belt;
a controller configured to identify a slip event of the belt by comparing an actual speed of the motor to an effective speed of the engine, and wherein the controller is configured to count the number of slip events and diagnose a belt failure if the number of slip events exceeds a predetermined number of slip events over a predetermined number of drive cycles;
wherein the controller is configured to identify the slip event if the actual speed of the motor is substantially different than the effective speed of the engine and reduce the actual speed of the motor during the slip event until the actual speed of the motor and the effective speed of the engine are substantially the same;
wherein the controller is configured to determine the effective speed of the engine by multiplying an actual speed of the engine by a pulley ratio;
wherein the controller is further configured to count the number of drive cycles by detecting a key-on event and by determining whether a predetermined amount of time has elapsed between the key-on event and a previous key-off event; and
wherein the controller is configured to count a number of attempts to diagnose the belt failure and compare the number of attempts to diagnose the belt failure to the number of drive cycles and determine an execution rate based on a ratio of the number of attempts to diagnose the belt failure to the number of drive cycles.

* * * * *